US005728767A

United States Patent [19]
Kanetou et al.

[11] Patent Number: 5,728,767
[45] Date of Patent: Mar. 17, 1998

[54] AQUEOUS RESIN COMPOSITION, METHOD FOR PRODUCING THE SAME AND USE THEREOF

[75] Inventors: Noriyuki Kanetou; Kenichi Fujino; Hiroaki Namba; Taro Abe, all of Iwakuni, Japan

[73] Assignee: Nippon Paper Industries Co., Ltd., Tokyo, Japan

[21] Appl. No.: 750,781

[22] PCT Filed: May 26, 1995

[86] PCT No.: PCT/JP95/01012

§ 371 Date: Dec. 20, 1996

§ 102(e) Date: Dec. 20, 1996

[87] PCT Pub. No.: WO96/00249

PCT Pub. Date: Jan. 4, 1996

[30] Foreign Application Priority Data

Jun. 23, 1994 [JP] Japan .................... 6-164763
May 15, 1995 [JP] Japan .................... 7-139909

[51] Int. Cl.⁶ .................................... C08L 51/06
[52] U.S. Cl. ............. 524/504; 524/531; 524/533; 523/407
[58] Field of Search .................... 524/504, 531, 524/536; 525/285, 301, 80, 81, 82

[56] References Cited

U.S. PATENT DOCUMENTS 4,174,335  11/1979  Ohdaira ..................... 524/504
4,806,581  2/1989  Walker ...................... 524/536

*Primary Examiner*—Paul R. Michl
*Attorney, Agent, or Firm*—Oblon, Spivak, McClelland, Maier & Neustadt, P.C.

[57] ABSTRACT

The invention relates to an aqueous resin composition characterized by comprising 80 to 10 parts by weight of modified polyolefin with weight average molecular weight of 1000 to 100000, modified by copolymerizing polypropylene, polyethylene, copolymer of propylene or ethylene with α-olefin or degradation products of these under heat or with oxidizing agent, radical-generating agent or the like, with 0.1 to 20% by weight of one kind or not less than two kinds of acid anhydride, carboxylic acid or alcohol with radically polymerizable double bond, and 20 to 90 parts by weight of one kind or a mixture of two or more kinds of acrylic or methacrylic monomers, mixed or dissolved and polymerized in water in the presence of surfactant and polymerization initiator. And, the aqueous resin composition of the invention not only shows excellent adhesion to polyolefin, but also has adherence to other organic substrates and inorganic substrates. In addition, because of little organic solvent contained, it is excellent in the aspects of safety and hygiene and environmental pollution.

14 Claims, No Drawings

1

AQUEOUS RESIN COMPOSITION, METHOD FOR PRODUCING THE SAME AND USE THEREOF

BACKGROUND OF THE INVENTION

The present invention relates to an aqueous resin composition, which can be used mainly for paint, primer, ink, adhesive, sealing agent or surface-processing agent. Moreover, since the resin composition of the invention can also be used in other aqueous resins and water-soluble resins such as aqueous acrylic and polyester depending on their uses, it can also be utilized as a modifier of film-forming materials.

Above all, since it can form a film and adhesive layer with excellent adhesion, flexibility and water resistance particularly on the polyolefin substrates etc. having nonpolar surface, it is useful as a resin for paint, primer, ink, sealing agent and adhesive applicable to car parts, etc., polyolefin film, polyolefinic moldings, etc. Moreover, it is applied also as a surface-processing agent or binder for fibrous and particle substrates.

So far, modified polyolefin compositions in which polyolefins such as polypropylene, polyethylene, copolymer of propylene or ethylene with α-olefin etc. are modified with unsaturated carboxylic acid or acid anhydride, and acid-modified chlorinated polyolefins in which they are further chlorinated have been used for painting materials, primer, ink, etc. In the present situation, however, these resins dissolve only into aromatic organic solvents such as toluene and xylene, hence they cannot help using large quantities of aromatic solvent, leading to the problems in the aspects of safety and hygiene and environmental pollution.

For this reason, in recent years, an aqueous resin wherein polyol, surfactant and basic substance are added to chlorinated polyolefin followed by aqueous conversion (U.S. Pat. No. 340845), an aqueous resin wherein chlorinated polyolefin modified with unsaturated carboxylic acid or acid anhydride is aqueous converted using surfactant and basic substance (Japanese Patent Application No. Hei 1-323506), etc. have been applied.

Attempts for producing aqueous dispersion of chlorinated polyolefin are disclosed in, for example, Japanese Unexamined Patent Publication Nos. Hei 1-153778, Hei 1-256556, Hei 2-284973, etc., but these use aromatic organic solvent at the time of production, thus making it difficult to completely eliminate organic solvent. Moreover, attempts for producing aqueous dispersion of modified polyolefin are also made and disclosed in, for example, Japanese Unexamined Patent Publication Nos. Sho 59-47244, Hei 2-286724, etc. However, if the material to be painted or to be adhered is polyolefin resin in the painting, adhesion, etc., then they have drawbacks of poor adhesion or water resistance, poor paintability, etc., hence such aqueous compositions have not still been put into practice. Moreover, in Japanese Unexamined Patent Publication No. Hei 3-182534, improved performance of coated film is undertaken by aqueous converting modified chlorinated polyolefin using surfactant and additionally by formulating aqueous polyurethane resin.

Because of nonreactive water-soluble urethane resin and surfactant, however, a phenomenon that the active agent components dissolve out from coated film by water and decrease the water resistance through the defect of coated film probably caused due to that took place.

Moreover, when forming a film using an aqueous converted chlorinated polyolefin resin aqueous converted using polyol and surfactant in large quantities, hydrophilic components such as polyol and surfactant are left behind in the film and they dissolve out by water, eading to a drawback of poor water resistance of film.

Furthermore, in an aqueous resin composition based on chlorinated polyolefin, large quantities of chlorinated resin component are contained, hence not only a problem arose in the weather resistance, but also a problem took place to no small extent in the disposal and the recycling treatment of end products with film or adhered layer formed.

Whereas, the applicant made applications on aqueous resins wherein polyolefin resin, chlorinated polyolefin resin and acid-modified polyolefin resin were aqueous converted using reactive surfactant (Japanese Patent Application Nos. Hei 4-258935, Hei 4-25893 and Hei 4-258937). These inventions aim at improved water resistance of film by fixing the hydrophilic substances existing in the film to the film.

The reactive surfactant has been used in the emulsion polymerization so far and, in the emulsion polymerization, it has a surface-active function to suspend monomer into water and it is taken into the structure of polymer to react with other monomer, bringing about an effect for improving the water resistance of reaction product.

The reactive surfactant however has a lower resin-dispersing ability compared with nonreactive surfactants with similar structure thereto, hence, for obtaining a stable aqueous converted product, it was required to increase the addition level or to use other polyol, nonreactive surfactant, etc. in combination.

Aqueous epoxy resin and aqueous blocked isocyanate are used generally for fiber processing, as crosslinking agent and as modifier of resins such as latex, acrylic and urethane resins, for surface processing of plastic film, paint, etc.

Also, in the case of introducing a crosslinked structure and further fixing the hydrophilic components through the combination with blocked isocyanate, the usage of blocked isocyanate was limited to maintain the adhesion of film formed to substrate.

On the other hand, the aqueous conversion of polyolefinic resins including chlorinated products is performed generally by a method wherein, after the resin raw material is dissolved into some solvent or other, the hydrophilic components such as surfactant and basic substance are added, then the solvent is substituted by water. Also, a method of aqueous converting the polyolefin and acid-modified chlorinated polyolefin by phase inversion at room temperature or in the heated and pressurized state is already investigated and applied for patent (Japanese Patent Application No. Hei 5-280127). A method of melting and mixing the raw material resin, surfactant and basic substance at a temperature higher than the softening point of resin and gradually adding water thereto to cause the phase inversion, thus leading to aqueous conversion, is known.

However, this method has been performed conventionally at ambient pressure. For this reason, when the viscosity of raw material resin below 100° C. is high or the like, the temperature of resin decreases by the addition of water and the viscosity of molten liquor increases, hence the stirring efficiency decreases, resulting in no uniform phase transition in many cases. Further, to decrease the viscosity of resin, it was required to add small amount of solvent or to raise the temperature above 100° C., applying pressure. In this method, epoxy compound, blocked isocyanate, etc. that react in a temperature region higher than the melting temperature of resin could not be allowed to coexist in the emulsification process of polyolefin resin.

Moreover, it is already publicly known that the chlorinated polyolefin is dissolved into acrylic monomer and, by adding a polymerization initiator, the suspension polymerization is conducted in water (Japanese Patent No. 1568123).

However, all of the investigations were made on chlorinated polyolefin and there are no reports on nonchlorine type modified polyolefin. Furthermore, there are no reports relating to a characteristic aqueous composition through the combination with epoxy resin, blocked isocyanate, urethane resin, alkyd resin or amino resin.

As described above, since the conventional modified polyolefin compositions containing chlorine are used as solutions in organic solvents, the toxicity of solvent, environmental issues, etc. posed the problems. Moreover, around the aqueous resin compositions with surfactant used in large quan-ties, that was devised in an effort to solve them, the problematic point of water resistance has hung conventionally. The invention aims at providing an aqueous resin composition that simultaneously solves each of these toxicity, environmental issues and poor water resistance of coated film.

Furthermore, since the aqueous resin composition according to the invention is using a modified polyolefin not containing chlorine, the recyclability and the disposability of products painted, coated or adhered using this aqueous resin composition can improve. Namely, by completely eliminating the generation of hydrochloric acid at the time of pulverizing and melting the end products containing the inventive composition for the purpose of recycling, the recyclability can improve. Moreover, the invention is also aiming at that, by eliminating the formation of chlorine derivatives and hydrochloric acid generating on incinerating disposal, not only the environmental pollution is prevented, but also the loading to mechanical equipment to be used for incineration is alleviated.

As a result of diligent investigations on the aqueous resin composition which has no problems of toxicity, pollution, etc. thus being excellent in the safety, which is chlorine-free without injuring the adhesion and adherence, and which can form film and adhesive layer with excellent water resistance for accomplishing the purpose aforementioned, the inventors have found that an aqueous dispersion containing modified polyolefin can be obtained by mixing or dissolving a modified polyolefin after specific modification and acrylic or methacrylic monomers and dispersing them into water together with surfactant and polymerization initiator to conduct the polymerization in water by the methods of emulsion polymerization, suspension polymerization, etc.

Moreover, it has been found that, by formulating blocked isocyanate, epoxy resin, urethane resin, alkyd resin, amino resin etc. to the dispersed resin before polymerization, not only a plurality of components can be composited more uniformly, but also the structure of emulsified particles can be designed for various core-shell type aqueous converted products.

Furthermore, it has been found that, by formulating water-resistant components and aqueous crosslinking components such as blocked isocyanate, epoxy resin, urethane resin and amino resin, which have already been aqueous converted, to the emulsified product after polymerization reaction, an aqueous resin composition capable of forming a film with better water resistance, surface property, chemical resistance and workability can be produced.

Still more, by formulating those crosslinking components, not only the adhesion and water resistance to nonpolar substrates, but also the adhesion to polar substrates such as metal surface improve, thus improving the adherence to nonpolar substrate and polar substrate, and, when converting to paint, various improvement effects have been found as well in the chemical resistance, surface properties (surface gloss etc.), weather resistance, etc., leading to the invention.

In the selection of surfactant, it has become clear that surfactants with poly(alkylene oxide) structure are preferable and further, when using organic materials such as polyolefin for the substrate, those with average molecular weight of preferably 200 to 5000 are preferable.

Moreover, it has been known that, when dissolving modified polyolefin into acrylic or methacrylic monomers and conducting the polymerization reaction, combined use of crosslinking component with no radical reactivity brings about significant effects on the enhancement in the water resistance, solvent resistance and gasoline resistance and the improvement in the adhesion.

Furthermore, after the introduction of that crosslinking component into aqueous converted product was investigated, it has been found that the crosslinking component can be dispersed more uniformly into aqueous resin by mixing or dissolving the crosslinking component and acrylic or methacrylic monomers before polymerization similarly to modified polyolefin and then conducting the emulsion polymerization or suspension polymerization in water, thereby forming more uniform crosslinks to improve the performance of coated film.

On the other hand, it has been known that, when blending the aqueous converted water-resistant component and crosslinking component with aqueous polyolefin resin prepared separately, the water-resistant component and crosslinking component distribute more nonuniformly in the film, but, not only the formulation level thereof can be adjusted freely depending on the uses, but also the types of water-resistant component and crosslinking component can be altered or two or more kinds of them can be combined depending on the type of substrates and curing conditions, thus being effective.

Namely, the invention relates to an aqueous resin composition characterized in that 80 to 10 parts by weight of modified polyolefin with weight average molecular weight of 1000 to 100000, modified by copolymerizing polypropylene, polyethylene, copolymer of propylene or ethylene with α-olefin or degradation products of these under heat or with oxidizing agent, radical-generating agent or the like, with 0.1 to 20% by weight of one kind or not less than two kinds of acid anhydride, carboxylic acid or alcohol with radically polymerizable double bond, and 20 to 90 parts by weight of one kind or mixture of two or more kinds of acrylic or methacrylic monomers are mixed or dissolved and polymerized in water in the presence of surfactant and polymerization initiator, and a method of producing the same.

Further, it relates to an aqueous resin composition characterized in that 80 to 10 parts by weight of modified polyolefin with weight average molecular weight of 1000 to 100000, modified by copolymerizing polypropylene, polyethylene, copolymer of propylene or ethylene with α-olefin or degradation products of these under heat or with oxidizing agent, radical-generating agent or the like, with 0.1 to 20% by weight of one kind or not less than two kinds of acid anhydride, carboxylic acid or alcohol with radically polymerizable double bond, 10 to 200 parts by weight of any one kind of blocked isocyanate, epoxy resin, urethane resin, amino resin and alkyd resin and 20 to 90 parts by weight of one kind or a mixture of two or more kinds of acrylic or methacrylic monomers are mixed or dissolved and polymerized in water in the presence of surfactant and polymerization initiator, and a method of producing the same.

Moreover, upon preparing the aqueous resin composition of the invention, an aqueous resin composition characterized by adding to 50 parts by weight of acrylic or methacrylic oligomer to 100 parts by weight of acrylic or methacrylic monomers at solids ratio is useful, because of improved compatibility between acrylic or methacrylic monomers and resin to be mixed or dissolved, thus allowing to form more uniform film.

Furthermore, upon preparing the aqueous resin composition of the invention, an aqueous resin composition characterized by adding 0.01 to 10 parts by weight of chain transfer-modifying agent to 100 parts b weight of acrylic or methacrylic monomers is effective in controlling the polymerization degree of acrylic or methacrylic monomers and adjusting the viscosity and leveling property on drying of emulsified product.

Still more, an aqueous resin composition characterized by containing surfactant with poly(alkylene oxide) structure as a surfactant and with weight average molecular weight of 200 to 5000 in a proportion of 0.1 to 50 parts by weight to 100 parts by weight of aqueous converting raw material resin as one component of surfactant components has good dispersing efficiency of resin and storage stability, which is preferable.

An aqueous resin composition and a method of producing the same characterized by formulating any one kind of aqueous blocked isocyanate, aqueous epoxy resin, aqueous urethane resin and aqueous amino resin to aqueous polyolefin resin composition in a proportion of 100:1 to 1:10 at solids ratio are excellent in the ply adhesion, water resistance, solvent resistance, chemical resistance, etc. In particular, an aqueous epoxy resin-formulated composition is used as a cold drying type by combining with curing agent, and an aqueous urethane resin-formulated composition not only improves the smoothness of dried film, but also has an effect to suppress the tack property of film after drying.

Moreover, film-forming materials such as paint, primer and ink, sealing agent, adhesive, binder, surface-processing agent and modifier of film-forming material containing the inventive aqueous resin composition are useful industrially.

SUMMARY OF THE INVENTION

The invention relates Co an aqueous resin composition characterized in that 80 to 10 parts by weight of modified polyolefin with weight average molecular weight of 1000 to 100000, modified by copolymerizing polypropylene, polyethylene, copolymer of propylene or ethylene with α-olefin or degradation products of these under heat or with oxidizing agent, radical-generating agent or the like, with 0.1 to 20% by weight of one kind or not less than two kinds of acid anhydride, carboxylic acid or alcohol with radically polymerizable double bond, and 20 to 90 parts by weight of one kind or mixture of two or more kinds of acrylic or methacrylic monomers are mixed or dissolved and polymerized in water in the presence of surfactant and polymerization initiator, and a method of producing the same.

Further, it relates to an aqueous resin composition characterized in that 80 to 10 parts by weight of modified polyolefin with weight average molecular weight of 1000 to 100000, modified by copolymerizing polypropylene, polyethylene, copolymer of propylene or ethylene with α-olefin or degradation products of these under heat or with oxidizing agent, radical-generating agent or the like, with 0.1 to 20% by weight of one kind or not less than two kinds of acid anhydride, carboxylic acid or alcohol with radically polymerizable double bond, 10 to 200 parts by weight of any one kind of blocked isocyanate, epoxy resin, urethane resin, amino resin and alkyd resin and 20 to 90 parts by weight of one kind or a mixture of two or more kinds of acrylic or methacrylic monomers are mixed or dissolved and polymerized in water in the presence of surfactant and polymerization initiator, and a method of producing the same.

DETAILED DESCRIPTION OF THE INVENTION

In following, the invention will be illustrated in detail.

As the polyolefins to be used in the invention, homopolymer of ethylene or propylene, random copolymers or block copolymers of ethylene or propylene with other comonomers, for example, α-olefin comonomers with carbon atoms of 2 or more, preferably 2 to 6 such as butene-1, pentene-1, hexene-1, heptene-1 and octene-1, or copolymers with two or more kinds of these comonomers are used. The weight average molecular weight of polyolefin is 1000 to 100000. They may be those obtained by publicly-known process, but such ones that were once synthesized to high molecular weight and then degraded with radical, oxygen, heat or the like are also used.

As the acid anhydrides or carboxylic acids with radically reactive double bond to be used for the modification of polyolefin, α,β-unsaturated carboxylic acids or their anhydrides, for example, maleic acid, fumaric acid, itaconic acid, citraconic acid, allylsuccinic acid, mesaconic acid, aconitic acid, their acid anhydrides, etc. are mentioned. As the alcohols with radically reactive double bond, hydroxyalkyl (meth)acrylates such as hydroxyethyl (meth)acrylate [hydroxyethyl acrylate and hydroxyethyl methacrylate are written together as hydroxyethyl (meth)acrylate, hereinafter same] and hydroxymethyl (meth)acrylate can be exemplified. The amount of α,β-unsaturated carboxylic acid or its acid anhydride or hydroxyalkyl (meth)acrylate to be graft copolymerized is preferable to be 0.1 to 20% by weight, and, if under 0.1% by weight, the stability on dispersing into water becomes poor and, if over 20% by weight, then the grafting efficiency becomes poor, which is uneconomic. Particularly preferable is 1 to 15% by weight. Moreover, the weight average molecular weight of resin graft copolymerized with α,β-unsaturated carboxylic acid or its acid anhydride is 1000 to 100000, but preferable is 3000 to 80000. If under 1000, the cohesive force is insufficient, leading to poor adhesion to polyolefin resin and, if over 100000, then the viscosity after dissolving polyolefin into acrylic or methacrylic monomers becomes high and the manipulation property on dispersing into water becomes poor, which is unpreferable. Bringing the molecular weight within this range is possible by selecting the molecular weight of raw material or the conditions on conducting graft reaction, and also by a method of conducting the graft reaction after the molecular weight of raw material was once dropped. Moreover, when using blocked isocyanate, epoxy resin, alkyd resin or amino resin in the preparation of aqueous converted product, the weight average molecular weight of modified polyolefin may be lower and 1000 to 60000 are preferable. Besides, the weight average molecular weight can be determined by means of GPC (gel permeation chromatography).

In the invention, one kind or not less than two kinds of α,β-unsaturated carboxylic acids or their acid anhydrides or hydroxyalkyl (meth)acrylates can be used simultaneously. The graft copolymerization of polyolefin with α,β- unsaturated carboxylic acid or its acid anhydride or hydroxyalkyl (meth)-acrylate may be conducted by the publicly known method, but particularly a method of melting polyolefin by heating it above melting point and graft copolymerizing in the presence of radical-generating agent is preferable. When simultaneously using α,β-unsaturated carboxylic acid or its acid anhydride and hydroxyalkyl (meth)acrylate, they may be graft copolymerized onto polyolefin, respectively, in the presence of radical-generating agent, or, for example, after α,β-unsaturated carboxylic acid was graft copolymerized onto polyolefin in the presence of radical-generating agent, hydroxyalkyl (meth)acrylate is graft copolymerized via ester bond, and then other α,β-unsaturated carboxylic acid or its acid anhydride or hydroxyalkyl (meth)acrylate may be copolymerized with unsaturated bond existing on the graft chain in the presence of radical-generating agent.

In the invention, upon preparing the aqueous polyolefin resin composition, surfactant and polymerization initiator are added.

The surfactants to be used in the invention include nonreactive surfactant with no radical polymerizability and reactive surfactant with radical polymerizability, and they may be used solely or may be used in combination. As the surfactant components with poly(alkylene oxide) structure and with weight average molecular weight of 200 to 5000, copolymer of ethylene oxide with propylene oxide, fatty alcohol poly(alkylene oxide) adduct (polyoxyethylene fatty alkyl ether etc.), sec-alcohol poly(alkylene oxide) adduct (polyoxyethylene sec-alcohol ether etc.), alkylamide poly (alkylene oxide) adduct, polyoxyalkylene alkylphenyl ether (polyoxyethylene nonylphenyl ether, polyoxyethylene dodecylphenyl ether, etc.), polyoxyalkylene sterol ether, polyoxyalkylene lanolin derivative, alkylene oxide derivative of alkylphenol-formalin condensate, polyoxyalkylene glycerine fatty acid ester (polyoxyethylene glycerine fatty acid ester etc.), polyoxyalkylene sorbitol fatty acid ester (polyoxyethylene sorbitol fatty acid ester etc.), polyoxyalkylene glycol fatty acid ester (polyoxyethylene glycol fatty acid ester etc.), polyoxyalkylene fatty acid amide (polyoxyethylene fatty acid amide etc.), polyoxyalkylene alkylamine (polyoxyethylene alkylamine, ethylene oxide-propylene oxide polymer adduct of alkylalkanolamine, etc.), and the like are used. Substance with poly(alkylene oxide) structure means a substance with chemical structure comprising oligomer or polymer produced through the homopolymerization or copolymerization (block copolymerization, random copolymerization, graft copolymerization, etc.) of alkylene oxides such as ethylene oxide and propylene oxide. Surfactant with weight average molecular weight of not less than 200 to not more than 5000, preferably not less than 300 to not more than 3000 is used. If the average molecular weight is under 200, the dispersing ability is low, thus showing no remarkable effect. Also, if the molecular weight is over 5000, the resin-dispersing ability decreases. Moreover, two or more kinds of these may be used in combination. Said surfactant component is used in amounts of 0.1 to 50 parts by weight, preferably 3 to 30 parts by weight to 100 parts by weight of aqueous converting raw material resin.

Additionally, as the nonreactive surfactants, nonionic type surfactants such as propylene glycol ester, sucrose ester, sorbitan alkyl ester, sorbitan fatty acid ester, polyglycerine ester, fatty acid alkanolamide, fatty acid monoglyceride and alkylamine oxide, anionic type surfactants capable of exemplifying alkyl sulfate, alkylphenol sulfonate, sulfosuccinate, etc. and also carboxylates, phosphates, etc. as well, ampholytic surfactants such as alkylbetaine and alkylimidazoline, and the like and mixtures of two or more kinds of these can be used.

As the reactive surfactants, those used generally as reactive surfactants or reactive emulsifiers may be employed, but ones with alkylphenyl group as a hydrophobic group and polyoxyethylene group as a nonionic hydrophilic group are preferable. For example, alkylpropenylphenol poly(ethylene oxide) adduct, alkyldipropenylphenol poly(ethylene oxide) adduct and salts of their sulfates, which are shown in Japanese Unexamined Patent Publication Nos. Hei 4-53802 and Hei 4-50204, are used. Thereamong, alkylpropenylphenol 20-mole ethylene oxide adduct, 30-mole adduct and 50-mole adduct, ammonium sulfate of alkylpropenylphenol 10-mole ethylene oxide adduct and ammonium sulfate of 20-mole adduct are preferable. Moreover, 1-alkylphenoxy-3-(2-propenyl)oxypropane-2-ol poly(ethylene oxide) adduct or its sulfate has excellent resin-dispersing ability and high polymerizability because of α,β-unsaturated double bond, which is preferable. These reactive surfactants can be reacted with aqueous converting resin raw material by the publicly known method using radical reaction initiator to fix to resin.

The usage of reactive surfactant is 0.1 to 60 parts by weight, preferably 0.1 to 30 parts by weight to 100 parts by weight of modified polyolefin being aqueous converting raw material resin. The usage can be altered appropriately depending on the addition level of nonreactive surfactant etc. being other hydrophilic components. When using the reactive surfactant, the reaction initiator is employed. This reactive surfactant may be reacted beforehand with aqueous converting raw material or may be added during aqueous converting process. For the reaction initiator, publicly known substance can be used.

The addition level of surface-active component combining nonreactive surfactant with reactive surfactant is 0.1 to 50 parts by weight to 100 parts by weight of total amount of resin component and monomer component, and the required level varies depending on the combination and use ratio of surface-active component, addition level of alcohol component, and type and amount of acrylic or methacrylic monomers.

Said surface-active component can be mixed with raw material resin or monomer component, but part of usage or overall amount may be mixed with water for addition.

When the amount of surface-active component is lower out of said range, the emulsifying efficiency decreases in the aqueous converting process, resulting in increased particle diameter and decreased storage stability of emulsified product.

Also, when it is higher, the water resistance of film formed using the aqueous resin composition decreases remarkably.

The acrylic or methacrylic monomers are compounds with structure shown by, for example, general formula 1 or 2.

$$CH_2=CHR_1—COOR_2 \qquad \text{General formula 1)}$$

Wherein $R_1$ is a hydrogen atom or lower alkyl group and $R_2$ is a hydrogen atom, glycidyl group, alkyl group with carbon atoms of 1 to 12, group comprising cyclic aliphatic hydrocarbon with carbon atoms of 5 to 12, or —$(CH_2)_n$—OH. Here, n denotes an integer of 1 to 12.

Concretely, they are (meth)acrylic acid, methyl (meth)-acrylate, ethyl (meth)acrylate, n-butyl (meth)acrylate, isobutyl (meth)acrylate, octyl (meth)acrylate, 2-ethylhexyl (meth)

acrylate, cyclohexyl (meth)acrylate, 2-cyclopentyl (meth) acrylate, glycidyl (meth)acrylate, 2-hydroxyethyl (meth) acrylate, hydroxymethyl (meth)acrylate, isobornyl (meth) acrylate, etc.

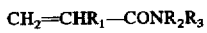  General formula 2)

Wherein $R_1$ denotes a hydrogen atom or lower alkyl group, $R_2$ denotes a hydrogen atom or lower alkyl group, and $R_3$ denotes a lower alkyl group.

Concretely, they are N-dimethylacrylamide, N,N-diethylacrylamide, N-isopropylacrylamide, N,N-di-n-butylacrylamide, N,N-di-n-butylmethacrylamide, isobornylacrylamide, isobornylmethacrylamide, etc.

Moreover, said reactive surfactant can be used as a part of acrylic or methacrylic monomers.

Furthermore, as other acrylic or methacrylic monomers usable in the invention, acrylonitrile, aromatic monomers such as styrene and divinylbenzene, vinyl ester monomers such as vinyl acetate, methyl maleate, maleic anhydride, etc. are mentioned.

One kind or a mixture of two or more kinds of these acrylic or methacrylic monomers can be used.

The usage of acrylic or methacrylic monomers is 20 to 90 parts by weight to 80 to 10 parts by weight of modified polyolefin, preferably 50 to 80 parts by weight to 50 to 20 parts by weight of modified polyolefin. If the usage is too low, then the emulsifying efficiency decreases and much of hydrophilic components such as surfactant should be used. Also, if too high, the adherence to the surface of nonpolar substrates such as polypropylene decreases remarkably.

The reaction initiator for starting the reactions of acrylic or methacrylic monomers and reactive surfactant may be publicly known substance, and both water-soluble initiators such as azobisisobutyronitrile, hydrogen peroxide and potassium persulfate and oil-soluble initiators can be used. In addition, redox type initiators can also be used. Moreover, combinations of them may be used.

As the organic peroxides, for example, benzoyl peroxide, dicumyl peroxide, lauroyl peroxide, 2,5-dimethyl-2,5-di(t-butylperoxy)hexine-3, di-t-butyl peroxide, t-butyl hydroperoxide, t-butyl peroxybenzoate, cumene hydroperoxide, etc. are mentioned, and they are used by selecting depending on the reaction temperature and reaction time.

The blocked isocyanates in the invention are isocyanate compounds with two or more isocyanate groups in one molecule, for example, isocyanates such as ethylenediisocyanate, propylenediisocyanate, tetramethylenediisocyanate, hexamethylenediisocyanate, decamethylenediisocyanate, m-phenylenediisocyanate, p-phenylenediisocyanate, 2,4-tolylenediisocyanate, 2,6-tolylenediisocyanate, 1,5-naphthylenediisocyanate, 4,4',4"-triphenylmethane-triisocyanate, 4,4'-diphenylmethanediisocyanate, 3,3'-dimethyl-4,4'-diphenylenediisocyanate, m-xylylenediisocyanate, p-xylylenediisocyanate, isophoronediisocyanate and lysineisocyanate, polyisocyanates with two or more functionalities obtainable through the addition reaction or addition polymerization reaction of excess of said isocyanate compounds with low-molecular polyols, for example, ethylene glycol, propylene glycol, 1,3-butylene glycol, neopentyl glycol, 2,2,4-trimethyl-1,3-pentanediol, hexamethylene glycol, cyclohexanedimethanol, trimethylolpropane, hexanetriol, glycerine, pentaerythritol, etc., polyisocyanates with biuret structure, polyisocyanates with allophanate linkage, isocyanates with nurate structure, and the like, blocked with blocking agent. Said blocking agents include phenolics such as phenol and cresol, alcoholics such as methanol, benzyl alcohol and ethylene glycol monomethyl ether, methyl acetoacetate, active methylenes such as dimethyl malonate, acetanilide, acid amides such as acetic amide, other imides, amines, imidazoles, ureas, carbamates, imines, oximes such as acetoxime and methyl ethyl ketoxime, mercaptans, sulfites, lactams such as e-caprolactam, and the like. Namely, the blocked isocyanates referred to so in the invention include blocked isocyanate, masked isocyanate, compounds called reactive urethane and analogues thereto, in general.

When adding the blocked isocyanate to reaction liquor before radical polymerization, the proportion of blocked isocyanate compound to modified polyolefin is used within a range from 1:8 to 20:1.

Also, when formulating the aqueous blocked isocyanate to reaction product after polymerized in water, the proportion of blocked isocyanate compound to modified polyolefin is used within a range from 1:100 to 10:1.

If the formulation level of blocked isocyanate to modified polyolefin is low exceeding said range, then the water resistance of film, adhesive layer, etc. becomes too low, posing a problem. Also, if too high, the adherence to nonpolar substrates such as polyolefin decreases, posing a problem.

The optimum proportion can be determined through the content of isocyanate group in the blocked isocyanate compound, the amount of active hydrogen reacting with isocyanate group such as hydroxyl group or carboxyl group in the component left behind in the coated film after drying treatment of modified polyolefin, surface-active components, etc. and the reaction rate of blocked isocyanate under the deblocking conditions (temperature, time, etc.) of blocked isocyanate, but excessive amount can be used, when additional active hydrogen exists in the linkage formed through the crosslinking reaction.

When using the blocked isocyanate, since the dissociation of said blocking agent is effective after evaporation of moisture in the drying process, the dissociation temperature of blocking agent is preferable to be above the set temperature in the drying process, but, if the drying temperature is equal to or above the baking temperature, then excessive blocked isocyanate is formulated to cope.

When formulating said blocked isocyanate beforehand to acrylic or methacrylic monomers, it may be water-dispersible or water-soluble or it may not be aqueous converted, but, when formulating it later to aqueous converted product, water-dispersible or water-soluble compound is used for it.

The aqueous blocked isocyanate compound in the invention is a compound that has isocyanate groups in its molecular structure, the isocyanate groups being blocked with suitable blocking agent, and that has water-solubility or water-dispersibility by itself, or is aqueous converted by some method or other such as addition of surfactant and formation of hydrophilic protective colloid, even if it may not have water-solubility or water dispersibility by itself.

In the process of adding and formulating blocked isocyanate to modified polyolefin resin in the invention, the modified polyolefin resin is dissolved into solvent and the blocked isocyanate compound is added to solution, then solvent may be substituted by water for aqueous conversion, or aqueous converted modified polyolefin resin and aqueous blocked isocyanate compound may be formulated for use.

Moreover, for the aqueous resin composition of the invention, a catalyst that promotes the deblocking reaction and the reaction between activated isocyanate group and other active hydrogen can be used, if need be.

As the catalysts, dibutyl tin dilaurate, dibutyl tin fatty acid salt, dibutyl tin diacetate, tetra-n-butyl-1,3-diacetoxy-distannoxane, tetra-n-butyl-1,3-dilauryloxy-distannoxane, di-n-butyl tin oxide, mono-n-butyl tin oxide, stannous octate, etc. are exemplified.

For the epoxy resin to be used in the invention, a substance that has one or more oxirane structures in its molecular structure and is liquid at room temperature or soluble into acrylic or methacrylic monomers can be used. Also, such a substance that becomes liquid by adding organic solvent, even if solid at room temperature, or is compatible with acrylic or methacrylic monomers can be used. As typical substances, derivatives of glycidyl group such as glycidyl ether, glycidyl ester, glycidylamine and glycidylimine, polyolefin epoxide, cycloalkene epoxide, epoxide acetal, etc. are used. Concretely, epoxidated derivatives from phenols such as bisphenol A type epoxy resin represented by bisphenol A diglycidyl ether, novolak type epoxy resin, polyphenol type epoxy resin, polyhydroxybenzene type epoxy resin, phenyl glycidyl ether and cresol monoglycidyl ether, copolymer of glycidyl methacrylate with other acrylic monomer, cyclohexene oxide-based epoxy resin, epoxy resins comprising aniline derivatives, triglycidyl isocyanurate, etc. are exemplified.

In the epoxy resin formulation, it is possible to formulate curing agent or curing catalyst depending on the conditions to use aqueous converted product to prepare a recipe fitted to film-forming conditions. As the curing agents or curing catalysts, followings are exemplified. Concretely, aliphatic polyamines represented by diethylenetriamine, aromatic polyamines represented by m-phenylenediamine, secondary amines represented by piperidine and pyrrolidine, tertiary amines represented by triethanolamine, hexamethylenetetramine and trisdiaminomethylphenol, acid anhydrides represented by phthalic anhydride, citraconic anhydride and pyromellitic anhydride, boron trifluoride-amine complex, phenolic novolak resin, urea resin initial condensate, melamine resin initial condensate, dicyandiamide, etc. are exemplified.

When adding epoxy resin to the reaction liquor before radical polymerization, the proportion of epoxy resin to modified polyolefin is used within a range from 1:8 to 20:1.

Also, when formulating aqueous epoxy resin to the reaction product after polymerized in water, the proportion of epoxy resin to modified polyolefin is used within a range from 1:100 to 10:1.

If the formulation level of epoxy resin to modified polyolefin is low exceeding said range, then the water resistance of film, adhesive layer, etc. becomes too low, posing a problem. Also, when using metal etc. as substrates, the adherence to substrates becomes low, posing a problem. If too high, the adherence to nonpolar substrates such as polyolefin decreases, posing a problem.

As the urethane resin to be used in the invention, publicly known substance can be used, but, preferably, a substance that is liquid near room temperature or becomes liquid by adding some solvent or other is suitable. Moreover, even if solid, the substance is only necessary to dissolve into acrylic or methacrylic monomers or modified polyolefin. Furthermore, when formulating urethane resin in the form of aqueous converted product upon preparing the aqueous resin composition of the invention, it is possible to formulate the urethane resin aqueous converted beforehand by some method or other.

As the active hydrogen-containing compounds to be used on producing the urethane resin used here, high-molecular polyol, low-molecular polyol and polyamine are mentioned.

As the low-molecular weight polyols, polyols with two or more functionalities such as ethylene glycol, propylene glycol, 1,3- or 1,4-butanediol, 3-methylpentanediol, 1,6-hexanediol, neopentyl glycol, diethylene glycol, cyclohexylene glycol, glycerine, trimethylolpropane, pentaerythritol, sorbitol and sucrose, and aromatic compounds containing two or more hydroxyl groups such as bisphenol A, bisphenol F, bisphenol S, hydroquinone and resorcinol are exemplified.

As the high-molecular weight polyols, polyether polyols (e.g. polyalkylene glycols such as polyethylene glycol and polypropylene glycol, and the like), polyester polyols (e.g. polyester polyols with two or more hydroxyl groups in molecule, obtained through the esterifying reaction of aliphatic carboxylic acids such as adipic acid, succinic acid, sebacic acid, azelaic acid, fumaric acid, maleic acid and dimerized linolenic acid and aromatic polycarboxylic acids such as phthalic acid, isophthalic acid and terephthalic acid with said low-molecular polyols or polyether polyols), polycaprolactone diol, polycarbonate diol, polybutadiene polyol, hydrogenated polybutadiene polyol and acrylic polyol, etc. are exemplified.

In addition, with polyol component, hydroxycarboxylic acids such as lactic acid, tartaric acid, citric acid, salicylic acid and dimethylolpropionic acid, and monoalcohols such as methanol, ethanol, propanol, 2-hydroxyethyl (meth)acrylate and hydroxypropyl (meth)acrylate can also be used partly in combination.

As the polyamines, aliphatic polyamines such as ethylenediamine, hexamethylenediamine, isophoronediamine and diethylenetriamine, aromatic polyamines such as tolylenediamine, diethyltolylenediamine, phenylenediamine, diphenylmethanediamine and dichlorodiphenylmethanediamine, alicyclic polyamines such as 4,4'-diaminodicyclohexylmethane, 4,4'-diaminodimethylcyclohexylmethane, 1,4-diaminocyclohexane and isophoronediamine, alkanolamines such as diethanolamine, monoethanolamine and propanolamine, and polyamines such as poly(alkylene oxide)polyamine are exemplified.

Further, one kind or two or more kinds of these polyamines can be used in combination, but, preferably, hexamethylenediamine, isophoronediamine and 4,4'-diaminodicyclohexylmethane are used.

As the polyisocyanates to be used upon producing urethane resin used here, aliphatic polyisocyanates such as ethylenediisocyanate, tetramethylenediisocyanate, hexamethylenediisocyanate and dodecamethylenediisocyanate and their trimers, isophoronediisocyanate and its trimer, dicyclohexylmethanediisocyanate and its trimer, alicyclic polyisocyanates such as cyclohexylenediisocyanate and methylhexylenediisocyanate, aromatic polyisocyanates such as xylylenediisocyanate, tetramethylxylylenediisocyanate, tolylenediisocyanate, diphenylmethanediisocyanate, polyphenylmethanepolyisocyanate and naphthylenediisocyanate and modified substances having carbodiimide group, urethodione group, urethoimine group, biuret group or isocyanurate group, based on those polyisocyanates are used.

When adding urethane resin to the reaction liquor before radical polymerization, the proportion of urethane resin to modified polyolefin is used within a range from 1:8 to 20:1.

Moreover, when formulating aqueous urethane resin to the reaction product after polymerized in water, the proportion of urethane resin to modified polyolefin is used within a range from 1:100 to 10:1.

If the formulation level of urethane resin to modified polyolefin is low exceeding said range, the water resistance etc. of film, adhesive layer, etc. become too low, posing a problem. Also, if too high, the adherence to nonpolar substrates such as polyolefin decreases, posing a problem.

The amino resin to be used in the invention means thermosetting resins obtainable by reacting amino compounds such as urea, melamine, benzoguanamine and acetoguanamine with formaldehyde.

As the amino resin to be used in the invention, publicly known substance can be used, but, preferably, a substance that is liquid near room temperature or becomes liquid through the addition of some solvent or other is desirable. Moreover, even if solid, the substance is only necessary to dissolve into acrylic or methacrylic monomers or modified polyolefin. Furthermore, when formulating the amino resin in the form of aqueous converted product upon preparing the aqueous resin composition of the invention, it is possible to formulate the amino resin aqueous converted beforehand by some method or other.

When adding the amino resin to the reaction liquor before radical polymerization, the proportion of amino resin to modified polyolefin is used within a range from 1:8 to 20:1.

Moreover, when formulating aqueous amino resin to the reaction product after polymerized in water, the proportion of amino resin to modified polyolefin is used within a range from 1:100 to 10:1.

When the formulation level of amino resin to modified polyolefin is low exceeding said range, the water resistance, solvent resistance, etc. of film, adhesive layer, etc. become too low, posing a problem. Also, if too high, then the adherence to nonpolar substrates such as polyolefin decreases, posing a problem.

Upon preparing the aqueous polyolefin resin composition of the invention, the basic component can be added during aqueous converting process or after aqueous conversion. The addition of basic component is because of ionizing the hydrophilic groups such as carboxyl group and sulfonic group, thus making the dispersion into water better, but sometimes it may not be used, when the reactive surfactant and nonreactive surfactant used are already neutralized with base.

Further, the acrylic or methacrylic oligomers to be used in the invention are compounds with a fixed repeating unit in the molecule and with at least one or not less than two double bonds in the molecule as typical features. Moreover, naturally, those called macromer or macromonomer (hereinafter referred to as macromonomer etc.) are included thereamong. Said oligomers point at compounds with double bond at the end of molecule, but they include compounds with functional group such as hydroxyl group or carboxyl group at both ends of molecule. The molecular weight of these acrylic or methacrylic oligomers lies in a range from several hundred to ten thousand, and, depending on the type and molecular weight of acrylic or methacrylic oligomers used, the physical properties of film and the stability of emulsion of copolymer obtained differ.

It is preferable to use acrylic or methacrylic oligomers within a range from 1 to 50 parts by weight to 100 parts by weight of acrylic or methacrylic monomers at solids ratio. If the usage is less than 1 part by weight, then the compatibility between modified polyolefin etc. and acrylic or methacrylic oligomer is poor, and, if more than 50 parts by weight, decreased stability of emulsion and poor manipulation due to increased viscosity result.

As the acrylic or methacrylic oligomers aforementioned, for example, caprolactone-modified acrylic or methacrylic oligomer, end hydroxyl group-containing (meth)acrylate oligomer, oligoester (meth)acrylate, urethane (meth)acrylate, epoxy (meth)acrylate, etc. are mentioned in addition to macromonomer etc. Thereamong, compounds containing a functional group such as hydroxyl group, carboxyl group, acid anhydride group, amino acid or the like are also included.

The alkyd resin to be used in the invention is prepared usually through the esterifying reaction of polybasic acid with polyol.

As the polybasic acids to be used for making alkyd resin, adipic acid, azelaic acid, cloresic acid, fumalic acid, isophthalic acid, maleic acid, phthalic acid, succinic acid, terephthalic acid, trimellitic acid, sebacic acid, etc. are exemplified. Moreover, it is possible to use these polybasic acids in combination or combinations of polybasic acid with monobasic acid. As the monobasic acids, eleostearic acid, linolenic acid, linoleic acid, oleic acid, ricinolic acid, benzoic acid, lauric acid, myristic acid, palmitic acid, pelargonic acid, stearic acid and toluic acid are exemplified. Further, as the polyols to be used for making alkyd resin, α-methyl glycoside, dipentaerythritol, glycerol, glycolic acid, pentaerythritol, trimethylolethane, trimethylolpropane, tripentaerythritol, sorbitol, etc. can be exemplified.

Using these raw materials, alkyd resin is produced by publicly known processes such as fatty acid process and ester exchange process, but, additionally, publicly known styrenated alkyd, acrylic-modified alkyd, phenol-modified alkyd and melamine-modified alkyd are also used.

Moreover, for the alkyd resin to be used in the invention, publicly known substance can be used, but, preferably, substance that is liquid near room temperature or becomes liquid through the addition of some solvent or other is suitable. Moreover, even if solid, the substance is only necessary to dissolve into acrylic or methacrylic monomers or modified polyolefin. The proportion of alkyd resin to modified polyolefin is used within a range from 1:8 to 20:1.

As the chain transfer-modifying agents to be used in the invention, dodecyl mercaptan, n-butyl mercaptan, triphenylmethane, n-butyl tetrabromide, benzene, etc. are exemplified.

The usage of chain transfer-modifying agent is 0.01 to 10 parts by weight to 100 parts by weight of acrylic or methacrylic monomers.

As for the chain transfer-modifying agent, if the usage is low exceeding said range, then its effect is not exerted and, if too high, uneconomical use results.

As the basic substances, sodium hydroxide, potassium hydroxide, ammonia, methylamine, ethylamine, propylamine, butylamine, hexylamine, octylamine, ethanolamine, propanolamine, diethanolamine, N-(β-aminoethyl)ethanolamine, N-methyldiethanolamine, N-methylethanolamine, dimethylamine, diethylamine, triethylamine, N,N-dimethylethanolamine, N,N-diethylethanolamine, N,N-dibutylethanolamine, 2-dimethylamino-2-methyl-1-propanol, 2-amino-2-methyl-1-propanol, morpholine, etc. can be exemplified. Since the degree of hydrophilicity of resin differs depending on the type of base used, it is needed to select appropriately depending on the conditions.

The amount of basic substance used is suitable to be in a range of 0.3 to 1.5 times the equivalent to the hydrophilic functional groups such as carboxyl group and sulfonic group and preferably to be 0.5 to 1.2 times. Moreover, when adding the basic substance, it is needed to control the pH of aqueous resin composition prepared to the vicinity of neutrality depending on the stability of blocked isocyanate compound to be formulated.

Furthermore, the aqueous resin composition of the invention is used by adding drying promoter components such as alcohol to improve the evaporating velocity of moisture on drying, if need be. In addition, various additives such as film-forming aid, pigments such as antirust pigment, coloring pigment and extending pigment, dye, thixotropy improver, viscosity modifier, fluidizing aid, surface modifier, primary antirust agent, defoamer, antiseptic, antimold agent, plasticizer, various stabilizers for improving heat resistance and weather resistance, and organic metal coordination compound are added in necessary amount, followed by mixing for use.

As the pigments, inorganic pigments such as carbon black, titanium dioxide, chromium oxide, aluminum powder, zinc oxide, iron oxide, mica and Prussian Blue, and organic pigments such as coupling azo type, condensed azo type, anthraquinone type, perylene type, quinacridone type, thioindigo type, dioxazine type and phthalocyanin type are exemplified.

As the inorganic fillers, calcium carbonate, silica, talc, glass, fiber, clay, etc. are mentioned.

As organic fillers, fluoro resin powder, silicone resin powder, polyamide resin powder, urethane resin powder, etc. are exemplified.

As the organic metal coordination compounds, organic zirconium coordination compounds such as zirconium tetraacetylacetonate and diisopropoxy zirconium bisacetonate, organic titanium coordination compounds such as titanium tetrakisacetylacetonate and diisopropoxy titanium bisacetylacetonate, organic aluminum coordination compounds such as aluminum trisacetylacetonate and aluminum triisopropoxide, and the like are mentioned.

These additives may be added at any time, i.e. before production, during production and after production of the composition of the invention.

Moreover, other aqueous resins, for example, aqueous resins such as aqueous acrylic resin, aqueous phenolic resin, aqueous polybutadiene resin, aqueous alkyd resin, aqueous chlorinated rubber, aqueous polyolefin resin and aqueous silicone resin are also blended for use.

The resin composition of the invention dispersed into water in this way is excellent in the adhesion onto polyolefin and excellent as a primer on painting, and is applied as a vehicle resin for aqueous paint, aqueous adhesive, binder resin for aqueous ink, aqueous coating material and aqueous surface-processing agent as well.

The inventive composition can be used for various substrates. As the substrates, it is used for inorganics such as iron, tin plate, galvanized iron, aluminum, zinc steel plate, glass, roofing tile, slate and ceramic, and wood, paper, natural fiber, synthetic fiber, cloth, rubbers (natural rubber, chloroprene rubber, isoprene rubber, neoprene rubber, etc.), plastics (polyolefins such as polyethylene and polypropylene, polystyrene, ABS resin, poly(vinyl chloride), polycarbonate, polyamide, polyacetal, polyester, polyurethane, phenol resin, melamine resin, epoxy resin, modified PEO, etc.), and the like, but it is particularly effective for the polyolefinic substrates above all.

In the invention, when using the aqueous resin composition that uses blocked isocyanate as a primer component and when upper-coating the two-component finishing paint, not only the water resistance and gasoline resistance of film improve, but also the ply adhesion improves.

In the invention, in the case of aqueous resin that uses epoxy resin, the curing conditions can be made wider by selecting the crosslinking agent and curing accelerator. In addition, not only it is excellent in the water resistance and adhesion onto substrate, it has an effect of improving the chemical resistance. Also, the adhesion onto metal surface improves.

In the invention, in the case of aqueous resin that uses urethane resin, not only it is excellent in the water resistance, but also the gasoline resistance and solvent resistance improve.

In the invention, in the case of aqueous resin that uses amino resin, not only the water resistance and chemical resistance improve, while maintaining the adhesion and adherence onto substrate, but also a coated film with excellent ply adhesion can be obtained, when using melamine paint for upper coating making this as a primer.

Moreover, since said crosslinking components react each other depending on the respective combinations, it is possible to combine them for using as crosslinking components.

In following, the invention will be illustrated based on the examples, but the invention is not confined to these. "Part" in examples indicates "part by weight".

PRODUCTION EXAMPLE 1

In a four-neck flask equipped with stirrer, cooling pipe, thermometer and dropping funnel, 300 parts of propylene-α-olefin copolymer (propylene component 75 mol %, ethylene component 20 mol %, 1-butene component 5 mol %, average molecular weight 25000) were dissolved into 700 parts of toluene by heating. Then, while stirring keeping the temperature of system at 115° C., 50 parts of maleic anhydride and 12 parts of di-t-butyl peroxide as a radical-generating agent were added dropwise over 2 hours, respectively, followed by aging for 3 hours thereafter. After reaction, the reaction product was cooled to room temperature and then it was thrown into 20 L acetone to purify, thus obtaining maleic anhydride graft copolymer with grafting rate of 7.8% by weight (average molecular weight 18500).

For measuring the average molecular weight, column TSK-GEL was attached to HPLC-8020 from Tosoh Corp. and the sample was dissolved into THF (tetrahydrofuran). Measurement was made at 40° C. and the molecular weight was determined from a calibration curve made up with polystyrene standard samples.

PRODUCTION EXAMPLE 2

In a four-neck flask equipped with stirrer, cooling pipe, thermometer and dropping funnel, 300 parts of propylene-butene-ethylene copolymer (propylene component 68 mol %, butene component 24 mol %, ethylene component 8 mol %, average molecular weight 68000) were molten by heating. Then, while stirring keeping the temperature of system at 180° C., 40 parts of maleic anhydride and 5 parts of dicumyl peroxide as a radical-generating agent were added dropwise over 3 hours, respectively, followed by reaction for 3 hours thereafter. After reaction, the reaction product was cooled to room temperature and then it was thrown into 20 L acetone to purify, thus obtaining maleic anhydride graft copolymer with grafting rate of 6.2% by weight. The average molecular weight determined by means of GPC was 46000.

PRODUCTION EXAMPLE 3

Into a four-neck flask equipped with stirrer, cooling pipe, thermometer and dropping funnel were charged 250 parts of polypropylene with average molecular weight of 32000 obtained by thermally decomposing polypropylene with average molecular weight of 130000, 50 parts of liquid polyolefin with average molecular weight of 10000 and 700 parts of xylene, and the mixture was dissolved uniformly under stirring by raising the temperature to 150° C. Then, the reaction system was replaced with nitrogen and 40 parts of maleic acid molten in a nitrogen stream and 6 parts of Perbutyl D (di-t-butyl peroxide) were added dropwise over 3 hours. After continued the reaction further for 3 hours, xylene was distilled off under reduced pressure. The acid-modified polyolefin thus obtained had average molecular weight of 27000 and addition rate of maleic acid of 6.3%.

PRODUCTION EXAMPLE 4

In a four-neck flask, 100 parts of maleic anhydride graft copolymer obtained in Production example 1 were dissolved by heating to convert to 20% by weight toluene solution, and after 4 parts of hydroxymethyl acrylate (from Wako Pure Chemical industries) were added and 0.5 parts of p-toluene sulfonic acid were thrown-in as a catalyst, the mixture was reacted for 5 hours at 100° C. As a result of analysis of reaction product with infrared spectrophotometer, complete esterification was confirmed. Successively, 100 parts of toluene were added to said reaction vessel and, keeping the temperature at 100° C., a solution of 0.05 parts of benzoyl peroxide (from Nippon Oil and Fats) dissolved into 1 part of toluene and 5 parts of 2-hydroxyethyl methacrylate were added dropwise over 2 hours, respectively. The copolymer obtained by distilling-off toluene under reduced pressure had average molecular weight of 42000 and grafting rate of 14.2% by weight.

EXAMPLE 1

Into a 2 L volume four-neck flask equipped with stirrer were charged 790 parts of 2-ethylhexyl methacrylate and 10 parts of methacrylic acid, and, to the mixture, 200 parts of modified polyolefin obtained in Production example 1, 12 parts of benzoyl peroxide and 12 parts of dodecyl mercaptan were added and stirred to obtain a uniform solution. To this solution, 900 parts of deionized water added with 150 parts of poly-(ethylene oxide) nonylphenyl ether (NS-230, nonionic surfactant from Nippon Oil and Fats) were added and emulsified for 30 minutes at 14000 rpm using homogenizer (HV-SL from Tokushu Kika Kogyo). Next, 950 parts of deionized water were charged into a 3 L four-neck flask and, after the temperature was raised to 60° C. under stirring, the emulsion was added over 3 hours at a constant velocity, which was further reacted for 3 hours. The emulsion thus obtained was filtered through #400 SUS wire screen to obtain an emulsion with solids of 30%.

EXAMPLE 2

The modified polyolefin used by similar manipulation and under similar conditions to Example 1 was replaced from one obtained in Production example 1 to one obtained in Production example 4 to obtain an emulsion. The solids were 30%.

EXAMPLE 3 into a 2 L volume four-neck flask equipped with stirrer were charged 160 parts of n-butyl acrylate, 50 parts of 2-ethylhexyl methacrylate and 90 parts of methyl methacrylate, and, to the mixture, 300 parts of modified polyolefin obtained in Production example 1 and 30 parts of poly(ethylene oxide) nonylphenyl ether (NS-240, nonionic surfactant from Nippon Oil and Fats) were added and dissolved. Then, 6 parts of benzoyl peroxide and 0.8 parts of dodecyl mercaptan were added and stirred to obtain a uniform solution. To this solution, 1500 parts of deionized water added with 40 parts of Kuraray Poval PVA-205 (dispersion stabilizer from Kuraray) and 30 parts of coconut amine ethylene oxide.propylene oxide adduct (from Lion) were added and emulsified with homogenizer (HV-SL from Tokushu Kika Kogyo). One fifth of this emulsion was charged into a 3 L four-neck flask and, after the temperature was raised over 30 minutes from room temperature to 50° C. under stirring, one fifth of emulsion was added over 30 minutes at a constant velocity while stirring and the temperature was raised to 70° C. From 1 hour later after start of reaction, three fifth of emulsion were added over 3 hours at a constant velocity, keeping the temperature at 70° C., which was then aged for 5 hours leaving at 70 ° C. The emulsion thus obtained was filtered through #400 SUS wire screen to obtain an emulsion with solids of 32%.

EXAMPLE 4

Into a 2 L volume four-neck flask equipped with stirrer were charged 250 parts of cyclohexyl methacrylate, 40 parts of glycidyl methacrylate, 25 parts of methacrylic acid and 400 parts of 2-ethylhexyl methacrylate, and, after 300 parts of modified polyolefin obtained in Production example 2 were added to the mixture and dissolved, 3 parts of benzoyl peroxide and 0.8 parts of dodecyl mercaptan were added and stirred to obtain a uniform solution. To this solution, 1500 parts of deionized water added with 10 parts of Kelzan M (dispersion stabilizer from Sansyo), 20 parts of poly (ethylene oxide) nonylphenyl ether (NS-270, nonionic surfactant from Nippon Oil and Fats), 40 parts of coconut amine ethylene oxide propylene oxide adduct (from Lion) and 10 parts of dodecylbenzenesulfonic acid were added, which was emulsified with homogenizer (HV-SL from Tokushu Kika Kogyo). One fifth of this emulsion was charged into a 3 L four-neck flask and, after the temperature was raised over 30 minutes from room temperature to 50° C. under stirring, one fifth of emulsion was added over 30 minutes at a constant velocity while stirring and the temperature was raised to 70 ° C. From 1 hour later after start of reaction, three fifth of emulsion were added over 3 hours at a constant velocity, keeping the temperature at 70 ° C. Thereafter, the emulsion was aged for 5 hours leaving at 70 ° C. The emulsion thus obtained was filtered through #400 SUS wire screen to obtain an emulsion with solids of 42%.

EXAMPLE 5

The modified polyolefin used by similar manipulation and under similar conditions to Example 4 was replaced from one obtained in Production example 2 to one obtained in Production example 3 to obtain an emulsion. The solids were 42%.

EXAMPLE 6

Into a 2 L volume four-neck flask equipped with stirrer were charged 250 parts of cyclohexyl methacrylate, 40 parts of glycidyl methacrylate, 25 parts of methacrylic acid, 400 parts of 2-ethylhexyl methacrylate, 45 parts of macromonomer AW-6S (from Toagosei Chemical Industry) and 75 parts of blocked isocyanate X-1392 (from Asahi Chemical Industry), and solvents in the system were distilled off at 45° C. under reduced pressure. After 300 parts of modified polyolefin obtained in Production example 2 were added to the mixture and dissolved, the solution was cooled below 10° C. and 8 g of Percumyl ND and 0.8 parts of dodecyl mercaptan were added and stirred to obtain a uniform solution. To this solution, 1500 parts of deionized water added with 10 parts of Kuraray Poval PVA-205 (dispersion stabilizer from Kuraray), 30 parts of poly(ethylene oxide) nonylphenyl ether (NS-208.5, nonionic surfactant from Nippon Oil and Fats), 35 parts of coconut amine ethylene oxide propylene oxide adduct (from Lion) and 10 parts of dodecylbenzenesulfonic acid were added, which was emulsified with homogenizer (HV-SL from Tokushu Kika Kogyo) while cooling. One fifth of this emulsion was charged into a 3 L four-neck flask and, after the temperature was raised over 60 minutes from room temperature to 40° C. under stirring, four fifth of emulsion was added over 5 hours at a constant velocity while stirring at 40° C. Thereafter, the emulsion was aged for 12 hours leaving at 40° C. The emulsion thus obtained was filtered through #400 SUS wire screen to obtain an emulsion with solids of 45%.

EXAMPLE 7

Into a 2 L volume four-neck flask equipped with stirrer were charged 250 parts of cyclohexyl methacrylate, 25 parts of glycidyl methacrylate, 35 parts of methacrylic acid, 300 parts of 2-ethylhexyl methacrylate and 100 parts of liquid epoxy resin Epicote 828 (from Yuka Shell), and solvents in the system were distilled off at 45° C. under reduced pressure. After 300 parts of modified polyolefin obtained in Production example 2 were added to the mixture and dissolved, the solution was cooled below 10° C. and 8 g of Percumyl ND and 0.8 parts of dodecyl mercaptan were added and stirred to obtain a uniform solution. To this solution, 1500 parts of deionized water added with 15 parts of Kuraray Poval PVA-205 (dispersion stabilizer from Kuraray), 30 parts of poly(ethylene oxide) nonylphenyl ether (NS-208.5, nonionic surfactant from Nippon Oil and Fats), 35 parts of coconut amine ethylene oxide. propylene oxide adduct (from Lion) and 20 parts of dodecylbenzenesulfonic acid were added, which was emulsified with homogenizer (HV-SL from Tokushu Kika Kogyo) while cooling.

This emulsion was subject to the polymerization reaction by the method similar to Example 6 and the emulsion thus obtained was filtered through #400 SUS wire screen to obtain an emulsion with solids of 42%.

EXAMPLE 8

Into a 2 L volume four-neck flask equipped with stirrer were charged 250 parts of cyclohexyl methacrylate, 40 parts of glycidyl methacrylate, 25 parts of methacrylic acid, 400 parts of 2-ethylhexyl methacrylate, 45 parts of macromonomer AW-6S (from Toagosei Chemical Industry) and 75 parts of Superflex 126 (polyurethane from Dai-ichi Kogyo Seiyaku), and solvents in the system were distilled off at 45° C. under reduced pressure. After 300 parts of modified polyolefin obtained in Production example 1 were added to the mixture and dissolved, the solution was cooled below 15° C. and 8 g of Percumyl ND and 0.8 parts of dodecyl mercaptan were added and stirred to obtain a uniform solution. To this solution, 1500 parts of deionized water added with 10 parts of Kuraray Poval PVA-205 (dispersion stabilizer from Kuraray), 30 parts of poly(ethylene oxide) nonylphenyl ether (NS-208.5, nonionic surfactant from Nippon Oil and Fats), 35 parts of coconut amine ethylene oxide. propylene oxide adduct (from Lion) and 15 parts of dodecylbenzenesulfonic acid were added, which was emulsified with Nanomizer (from Tokushu Kika Kogyo) while cooling. This emulsion was subject to the polymerization reaction by the method similar to Example 6 and the emulsion thus obtained was filtered through #400 SUS wire screen to obtain an emulsion with solids of 45%.

EXAMPLE 9

Into a 2 L volume four-neck flask equipped with stirrer were charged 250 parts of cyclohexyl methacrylate, 25 parts of glycidyl methacrylate, 35 parts of methacrylic acid and 300 parts of 2-ethylhexyl methacrylate, and, after 300 parts of modified polyolefin obtained in Production example 1 were added to the mixture and dissolved, 180 parts of Phthalkyd V904 (alkyd resin from Hitachi Chemical) were charged and solvents in the system were distilled off at 45° C. under reduced pressure. This mixture was cooled below 15° C. and 8 g of Percumyl ND and 0.8 parts of dodecyl mercaptan were added and stirred to obtain a uniform solution. To this solution, 1500 parts of deionized water added with 15 parts of Kuraray Poval PVA-205 (dispersion stabilizer from Kuraray), 30 parts of poly(ethylene oxide) nonylphenyl ether (NS-208.5, nonionic surfactant from Nippon Oil and Fats), 20 parts of Aquaron HS-10 (reactive surfactant from Dai-ichi Kogyo Seiyaku) and 20 parts of dodecylbenzenesulfonic acid were added, which was emulsified with homogenizer (HV-SL from Tokushu Kiko Kogyo) while cooling.

This emulsion was subject to the polymerization reaction by the method similar to Example 6 and the emulsion thus obtained was filtered through #400 SUS wire screen to obtain an emulsion. The solids were 44%.

EXAMPLE 10

Into a 2 L volume four-neck flask equipped with stirrer were charged 150 parts of cyclohexyl methacrylate, 25 parts of glycidyl methacrylate, 85 parts of methacrylic acid and 250 parts of 2-ethylhexyl methacrylate, and, after 300 parts of modified polyolefin obtained in Production example 1 were added to the mixture and dissolved, 150 parts of Super Beckamine L-127-60 (melamine resin from Dainippon Ink and Chemicals) were charged and solvents in the system were distilled off at 45° C. under reduced pressure. This mixture was cooled below 15° C. and 8 g of Percumyl ND and 0.8 parts of dodecyl mercaptan were added and stirred to obtain a uniform solution. To this solution, 1500 parts of deionized water added with 15 parts of Kuraray Poval PVA-205 (dispersion stabilizer from Kuraray), 30 parts of poly(ethylene oxide) nonylphenyl ether (NS-208.5, nonionic surfactant from Nippon Oil and Fats), 20 parts of Aquaron HS-10 (reactive surfactant from Dai-ichi Kogyo Seiyaku) and 20 parts of dodecylbenzene-sulfonic acid were added, which was emulsified with homogenizer (HV-SL from Tokushu Kiko Kogyo) while cooling. An emulsion was obtained by the manipulation similar to Example 6. The solids were 41%.

EXAMPES 11 through 20

Aqueous resin components were formulated to the emulsions obtained in Examples 3 through 10 according to recipes shown in Table 1. However, "part" in Table 1 means "solids part by weight".

TABLE 1

| Example No. | Aqueous resin formulated | | | |
|---|---|---|---|---|
| | Example No. | Part | Aqueous resin | Part |
| 11 | 3 | 100 | Aqueous block isocyanate[1] | 100 |
| 12 | 4 | 100 | | 100 |
| 13 | 7 | 100 | | 30 |
| 14 | 3 | 100 | Aqueous epoxy resin[2] | 35 |
| 15 | 6 | 100 | | 50 |
| 16 | 10 | 100 | | 40 |
| 17 | 6 | 100 | Superflex 190[3] | 25 |
| 18 | 7 | 100 | Superflex 900[3] | 25 |

TABLE 1-continued

| Example | Aqueous resin formulated | | | |
|---|---|---|---|---|
| No. | Example No. | Part | Aqueous resin | Part |
| 19 | 5 | 100 | Water Sol S695[4] | 60 |
| 20 | 7 | 100 | | 25 |

[1] HMDI-based nurate type aqueous blocked isocyanate, X-1328 from Asahi Chemical Industry.
[2] Aqueous product was obtained by mixing 100 parts of bisphenol A type epoxy resin Aquatoto 510 (from Toto Kasei) with 38 parts of Epicure 8799 (from Toto Kasei), followed by addition of water.
[3] Aqueous urethane resin from Dai-ichi Kogyo Seiyaku.
[4] Aqueous melamine resin from Dainippon Ink and Chemicals.

COMPARATIVE EXAMPLE 1

After 500 g of chlorinated polypropylene resin, Superclone 803 MW (from Nippon Paper Industries Co., Ltd., chlorine content 29.5%, 20% toluene solution by solids weight) were heated to 90° C. and 9.6 g of morpholine were added, 15 g of poly(ethylene oxide) nonylphenyl ether (NS-212 from Nippon Oil and Fats) were added. After toluene was distilled off under reduced pressure, water was added gradually while stirring at 100° C. to obtain an aqueous resin composition (solids 40%) by phase inversion emulsification method.

COMPARATIVE EXAMPLE 2

After 500 g of maleic acid-modified chlorinated polypropylene (average molecular weight 60000, grafting rate of maleic acid 2.3%, chlorine content 24.5%, 20% toluene solution by solids weight) were heated to 90° C. and 9.6 g of morpholine were added, 15 g of poly(ethylene oxide) nonylphenyl ether (NS-212 from Nippon Oil and Fats) were added. After toluene was distilled off under reduced pressure, water was added gradually while stirring at 100° C. to obtain an aqueous resin composition (solids 40%) by phase inversion emulsification method.

COMPARATIVE EXAMPLE 3

Replacing the maleic acid-modified polyolefin resin in Example 3 with 300 parts of maleic acid-modified chlorinated polypropylene (average molecular weight 60000, grafting rate of maleic acid 2.3%, chlorine content 24.5%, solids 100%), an emulsion (solids 32%) was obtained by the same manipulation as in Example 3.

Test of coated film
Preparation method of specimen

PP plate painted with two-component urethane upper coating (abbreviated as specimen A)

Each of aqueous resin compositions prepared in Examples 1 through 8, 11 through 13 and 17 and Comparative examples 1 through 3 was spray coated onto a polypropylene plate, which was dried for 15 to 20 minutes at 80° C. The film thickness was adjusted to 10 to 15 µm. Next, two-component urethane-based paint for upper coating was painted and, after allowed to stand for 10 minutes at room temperature, this was baked for 40 minutes at 100° C. using fan dryer. The painted plate obtained was preserved for a week at room temperature and then coated film was tested.

PP plate painted with one-component melamine upper coating (abbreviated as specimen B)

Each of aqueous resin compositions prepared in Examples 1 through 6, 9, 10, 19 and 20 and Comparative examples 1 through 3 was spray coated onto a polypropylene plate, which was dried for 15 to 20 minutes at 80° C. The film thickness was adjusted to 10 to 15 µm. Next, one-component melamine-based paint for upper coating was painted and, after allowed to stand for 10 minutes at room temperature, this was baked for 40 minutes at 120° C. using fan dryer. The painted plate obtained was preserved for a week at room temperature and then coated film was tested.

Soft steel plate painted with two-component urethane upper coating (abbreviated as specimen C)

Each of aqueous resin compositions prepared in Examples 7, 14 through 16 and 18 and Comparative examples 1 through 3 was spray coated onto a soft steel plate washed with toluene, which was dried for 15 to 20 minutes at 80° C. The film thickness was adjusted to 10 to 15 µm. Next, two-component urethane-based paint for upper coating was painted and, after allowed to stand for 10 minutes at room temperature, this was baked for 40 minutes at 100° C. using fan dryer. The painted plate obtained was preserved for a week at room temperature and then coated film was tested.

Soft steel plate painted with one-component melamine upper coating (abbreviated as specimen D)

Each of aqueous resin compositions prepared in Examples 9, 10, 19 and 20 and Comparative examples 1 through 3 was spray coated onto a soft steel plate washed with toluene, which was dried for 15 to 20 minutes at 80° C. The film thickness was adjusted to 10 to 15 µm. Next, one-component melamine-based paint for upper coating was painted and, after allowed to stand for 10 minutes at room temperature, this was baked for 40 minutes at 120° C. using fan dryer. The painted plate obtained was preserved for a week at room temperature and then coated film was tested.

Glass plate painted with resin (abbreviated as specimen E)

Each of aqueous resin compositions prepared in Examples 1 through 20 and Comparative examples 1 through 3 was diluted to a concentration of 30% with water and coated onto a glass plate using #16 coating rod. The glass plate coated with resin was dried for 20 minutes at 80° C. and then baked for 40 minutes at 120° C. After the painted plate obtained was preserved for a week at room temperature, the coated film was tested.

Testing method of coated film
(Adhesion test)

On the surface of coated film, 100 cross-cuts were made at intervals of 1 mm by making incisions reaching base with cutter. Cellophane adhesive tape was adhered closely thereon and peeled off five times in the direction of 180° to count the number of remaining cross-cuts.

(Test for gasoline resistance)

On the surface of coated film, insicions reaching base were made with cutter, which was dipped into gasoline (lead-free high-octane gasoline from Nippon Oil) for 4 hours, and then the state of coated film was observed visually.

(Test for moisture resistance)

Bottom one fifth area of painted plate was dipped into water in a tightly closed vessel and treated for 5 days at 50° C. Then, the amount of blister and the degree of peeling were compared.

(Test for warm water resistance)

The painted plate was dipped into warm water of 40° C. for 240 hours and examined the state of coated film for generation of blister, etc. Then, incisions reaching substrate were made and cellophane adhesive tape was adhered closely thereon and peeled off five times in the direction of 180° to compare the amount of remaining coated film.

(Test for flexing resistance)

The painted plate was folded down at 180° with 1 in. φ mandrel to examine the state of coated film.

(Test for storage stability)

The aqueous resin composition sample (solids 25%) prepared was placed in a 250 ml volume glass vessel and the extent of separation of aqueous phase from emulsion phase and the formation of resin agglomerates were compared over time at room temperature.

(Test for weather resistance)

A 30 μm thick film was formed on a glass plate and the weather resistance was compared using Q-U-V accelerated weathering tester (from Q-Panel Co., treatment conditions: light source UVB313, 40 watt, temperature 36° C., treatment time 400 hours). After treatment, the degree of yellowing of film on glass plate was evaluated using Hunter tester.

(Test for surface properties)

With respect to the painted surface of specimens A and B after upper coating and baking, smoothness of surface, whisker, citron texture, etc. were evaluated visually.

(Combustion test)

The film of specimen E formed on glass plate was scratched in amount of 1 g and the film component obtained from each specimen was burned in a Sheniger flask under atmosphere of oxygen. Hydrochloric acid generated from sample by combustion was absorbed into water to quantitatively determine the amount of hydrochloric acid generated by titration.

In Table 2, results of test for storage stability and test for weather resistance used specimen E and results of combustion test are shown.

Moreover, in Table 3, results of adhesion test, test for gasoline resistance, test for moisture resistance, test for warm water resistance and test for flexing resistance used each specimen are shown.

Furthermore, in Table 4, results of adhesion test, test for alkali resistance, test for acid resistance and test for warm water resistance used each specimen are shown.

TABLE 2

| Example No. of evaluated composition | Test for storage stability One month | Test for storage stability Three months | Test for weather resistance | Combustion test (g/1 g film) |
|---|---|---|---|---|
| Example 1 | O | O | O | under 0.01 |
| Example 2 | O | O | O | under 0.01 |
| Example 3 | O | O | O | under 0.01 |
| Example 4 | O | O | O | under 0.01 |
| Example 5 | O | O | O~Δ | under 0.01 |
| Example 6 | O~Δ | X | O | under 0.01 |
| Example 7 | O | O | Δ | under 0.01 |
| Example 8 | O | O | O | under 0.01 |
| Example 9 | O | O~Δ | O | under 0.01 |
| Example 10 | O | O | O | under 0.01 |
| Example 11 | O | O | ⊙ | under 0.01 |
| Example 12 | O | O | ⊙ | under 0.01 |
| Example 13 | Δ | X | O | under 0.01 |
| Example 14 | O~Δ | Δ | O | under 0.01 |
| Example 15 | O | X | Δ | under 0.01 |
| Example 16 | Δ | X | O | under 0.01 |
| Example 17 | O | Δ | O | under 0.01 |
| Example 18 | O | Δ | O | under 0.01 |
| Example 19 | O | O | O | under 0.01 |
| Example 20 | Δ | X | O | under 0.01 |
| Comparative example 1 | O | Δ | XX | 0.26 |
| Comparative example 2 | O | Δ | XX | 0.22 |
| Comparative example 3 | O | O | X | 0.10 |

Evaluation results in table are as follows:
⊙ Very good, O Good; Δ Slightly poor, X poor, XX Very poor
In the combustion test, amount of hydrochloric acid generated per 1 g of film is shown.

TABLE 3

| Example No. of evaluated composition | Specimen | Adhesion | Moisture resistance | Warm water resistance | Gasoline resistance | Flexing resistance | Surface property |
|---|---|---|---|---|---|---|---|
| Example 1 | A | O | O~Δ | O~Δ | Δ | Δ | O |
| Example 2 | A | O | O | O | O~Δ | Δ | O |
| Example 3 | A | O | O~Δ | O~Δ | Δ | Δ | O~Δ |
| Example 4 | A | O | O~Δ | O~Δ | Δ | Δ | O~Δ |
| Example 5 | A | O | O~Δ | O~Δ | Δ | Δ | O~Δ |
| Example 6 | A | ⊙ | O | O | O | O | O |
| Example 7 | A | ⊙ | O | O | O | O | O |
| Example 8 | A | O | O | O | O | O | O |
| Example 11 | A | O | ⊙ | ⊙ | ⊙ | ⊙ | ⊙ |
| Example 12 | A | O | ⊙ | ⊙ | ⊙ | ⊙ | ⊙ |
| Example 17 | A | O | O | O | ⊙ | O | O |
| Comparative example 1 | A | O | XX | XX | X | XX | Δ |
| Comparative example 2 | A | O | XX | XX | X | XX | Δ |
| Comparative example 3 | A | O | Δ | X | Δ | Δ | O |
| Example 1 | B | O | O~Δ | O~Δ | O | Δ | O |
| Example 2 | B | O | O | O~Δ | O | Δ | O |
| Example 3 | B | O | O~Δ | O~Δ | O | Δ | O |
| Example 4 | B | O | O~Δ | O~Δ | O | X | O |
| Example 5 | B | O | O~Δ | O | O | Δ | O |
| Example 6 | B | O | O | O | O | Δ | O~Δ |
| Example 9 | B | ⊙ | O | O | ⊙ | O | O |
| Example 10 | B | O | O | O | O | O | O |
| Example 19 | B | ⊙ | O | O | ⊙ | O~Δ | O |

TABLE 3-continued

| Example No. of evaluated composition | Specimen | Adhesion | Moisture resistance | Warm water resistance | Gasoline resistance | Flexing resistance | Surface property |
|---|---|---|---|---|---|---|---|
| Example 20 | B | ⊚ | ○ | ○ | ⊚ | ○~Δ | ○ |
| Comparative example 1 | B | ○ | Δ | X | Δ~X | X | ○ |
| Comparative example 2 | B | ○ | Δ | X | Δ~X | X | ○ |
| Comparative example 3 | B | ○ | ○~Δ | Δ | Δ~X | ○ | ○ |

Evaluation results in table are as follows:
⊚ Very good, ○ Good, Δ Slightly poor, X Poor, XX Very poor

TABLE 4

| Example No. of evaluated composition | Specimen | Adhesion | Alkali resistance | Acid resistance | Warm water resistance |
|---|---|---|---|---|---|
| Example 7 | C | ○ | ○~Δ | ○ | ○ |
| Example 14 | C | ⊚ | ○ | ○ | ⊚ |
| Example 15 | C | ⊚ | ○ | ○ | ⊚ |
| Example 16 | C | ⊚ | ○ | ○ | ⊚ |
| Example 18 | C | ○ | ○~Δ | ○ | ○ |
| Comparative example 1 | C | X | X | X | XX |
| Comparative example 2 | C | X | X | X | XX |
| Comparative example 3 | C | Δ | Δ | ○~Δ | X |
| Example 9 | D | ○ | ○~Δ | Δ | ○ |
| Example 10 | D | ⊚ | ○ | ○ | ○ |
| Example 19 | D | ⊚ | ○ | ○ | ○ |
| Example 20 | D | ⊚ | ○ | ○ | ○ |
| Comparative example 1 | D | X | X | X | X |
| Comparative example 2 | D | X | X | X | X |
| Comparative example 3 | D | Δ | ○~Δ | ○~Δ | X |

Evaluation results in table are as follows:
⊚ Very good, ○ Good, Δ Slightly poor, X Poor, XX Very poor The aqueous resin composition of the invention not only shows excellent adhesion to polyolefin, but also has adherence to other organic substrates and inorganic substrates. Moreover, a film formed with this is excellent in the moisture resistance, water resistance, etc. and decreases the corrosion of equipment as well in the incineration disposal and recycling of the products provided with painting, adhesion, printing, surface treatment, sealing, etc. using materials containing this, because of being chlorine-free. Furthermore, it is excellent in the aspects of safety and hygiene and environmental pollution, because of little organic solvent contained.

What is claimed is:

1. An aqueous resin composition consisting essentially of:
   Component (A) 80 to 10 parts by weight of a modified polyolefin; and
   Component (B) 20 to 90 parts by weight of an acrylic or methacrylic monomer or a mixture thereof;
   wherein said modified polyolefin has weight average molecular weight of 1000 to 100000; and
   wherein said modified polyolefin is modified by copolymerizing polypropylene, polyethylene, a copolymer of propylene or ethylene with an α-olefin or a degradation products thereof under heat or with an oxidizing agent, a radical-generating agent or the like, with 0.1 to 20% by weight of an acid anhydride; a carboxylic acid; an alcohol with radically polymerizable double bond; or a mixture thereof;
   and wherein said component (A) and said component (B) are mixed or dissolved and polymerized in water in the presence of a surfactant and a polymerization initiator.

2. An aqueous resin composition consisting essentially of:
   component (A) 80 to 10 parts by weight of modified polyolefin;
   component (B) 10 to 200 parts by weight of a resin selected from the group consisting of a blocked isocyanate, an epoxy resin, an urethane resin, an amino resin and an alkyd resin; and component (C) 20 to 90 parts by weight of an acrylic or methacrylic monomer or a mixture thereof;
   wherein said modified polyolefin has weight average molecular weight of 1000 to 100000; and
   wherein said modified polyolefin is modified by copolymerizing polypropylene, polyethylene, a copolymer of propylene or ethylene with an α-olefin or a degradation product thereof under heat or with oxidizing agent, radical-generating agent or the like, with 0.1 to 20% by weight of acid anhydride; carboxylic acid; alcohol with radically polymerizable double bond or a mixture thereof;
   and wherein said components (A), (B), and (C) are mixed or dissolved and polymerized in water in the presence of a surfactant and a polymerization initiator.

3. The aqueous resin composition of claim 1, wherein 1 to 50 parts by weight of acrylic or methacrylic oligomer are added to 100 parts by weight of acrylic or methacrylic monomers at solids ratio.

4. The aqueous resin composition of claim 1, wherein 0.01 to 10 parts by weight of chain transfer modifier are added to 100 parts by weight of acrylic or methacrylic monomers.

5. The aqueous resin composition of claim 1, wherein surfactant with poly(alkylene oxide) structure as a surfactant and with weight average molecular weight of 200 to 5000 is contained in a proportion of 0.1 to 50 parts by weight to 100 parts by weight of aqueous converting raw material resin as one component of surfactant components.

6. The aqueous resin composition of any of claim 1, wherein any one kind of aqueous blocked isocyanate, aqueous epoxy resin, aqueous urethane resin and aqueous amino resin is formulated to aqueous polyolefin resin composition in a proportion of 100:1 to 1:10 at solids ratio.

7. A method of producing an aqueous resin composition consisting essentially of the steps of:

mixing or dissolving (A) 80 to 10 parts by weight of a modified polyolefin with (B) 20 to 90 parts by weight of an acrylic or methacrylic monomer or a mixture thereof; and polymerizing said components (A) and (B) in water in the presence of a surfactant and a polymerization initiator;

wherein said modified polyolefin has weight average molecular weight of 1000 to 100000; and said modified polyolefin is modified by copolymerizing polypropylene, polyethylene, a copolymer of propylene or ethylene with an α-olefin or a degradation product thereof under heat or with oxidizing agent, radical-generating agent or the like, with 0.1 to 20% by weight of an acid anhydride; a carboxylic acid; an alcohol with radically polymerizable double bond, or a mixture thereof.

8. A method of producing an aqueous resin composition consisting essentially of the steps of:

mixing or dissolving (A) 80 to 10 parts by weight of a modified polyolefin with (B) 10 to 200 parts by weight of a resin selected from the group consisting of a blocked isocyanate, an epoxy resin, an urethane resin, an amino resin and an alkyd resin and (C) 20 to 90 parts by weight of an acrylic or methacrylic monomer or a mixture thereof; and polymerizing said (A), (B) and (C) in water in the presence of a surfactant and a polymerization initiator;

wherein said modified polyolefin has weight average molecular weight of 1000 to 100000; and said modified polyolefin is modified by copolymerizing polypropylene, polyethylene, a copolymer of propylene or ethylene with an α-olefin or a degradation product thereof under heat or with oxidizing agent, radical-generating agent or the like, with 0.1 to 20% by weight of an acid anhydride; a carboxylic acid; an alcohol with radically polymerizable double bond; or a mixture thereof.

9. A method of producing an aqueous resin composition consisting essentially of the steps of:

mixing or dissolving (A) 80 to 10 parts by weight of a modified polyolefin with (B) 20 to 90 parts by weight of an acrylic or methacrylic monomer or a mixture thereof, polymerizing said (A) and (B) in water in the presence of a surfactant and a polymerization initiator, and formulating an aqueous resin selected from the group consisting of an aqueous blocked isocyanate resin, an aqueous epoxy resin, an aqueous urethane resin and an aqueous amino resin to an aqueous polyolefin resin composition obtained in a proportion of 100:1 to 1:10 at solids ratio, wherein said modified polyolefin has weight average molecular weight of 1000 to 100000, and wherein said modified polyolefin is modified by copolymerizing polypropylene, polyethylene, a copolymer of propylene or ethylene with an α-olefin or a degradation product thereof under heat or with an oxidizing agent, a radical-generating agent or the like, with 0.1 to 20% by weight of an acid anhydride; a carboxylic acid; an alcohol with radically polymerizable double bond; or a mixture thereof.

10. A method of producing an aqueous resin composition consisting essentially of the steps of:

mixing or dissolving (A) 80 to 10 parts by weight of a modified polyolefin with (B) 10 to 200 parts by weight of a resin selected from the group consisting of a blocked isocyanate, an epoxy resin, an urethane resin, an amino resin and an alkyd resin and (C) 20 to 90 parts by weight of an acrylic or methacrylic monomer or a mixture thereof; polymerizing said (A), (B) and (C) in water in the presence of a surfactant and a polymerization initiator; and formulating a resin selected from the group consisting of an aqueous blocked isocyanate resin, an aqueous epoxy resin, an aqueous urethane resin and an aqueous amino resin to aqueous polyolefin resin composition obtained in a proportion of 100:1 to 1:10 at solids ratio.

11. A composition; comprising the aqueous resin composition of claim 1 and a drying promoter component, a film-forming aid, a pigment, a dye, a thixotropy improver, a viscosity modifier, a fluidizing aid, a surface modifier, a primary antirust agent, a defoamer, an antiseptic, an anti-mold agent, a plasticizer, a heat resistance stabilizer, a weather resistance stabilizer, an organic metal coordination compound or a filler.

12. A composition, comprising the aqueous resin composition of claim 2 and a drying promoter component, a film-forming aid, a pigment, a dye, a thixotropy improver, a viscosity modifier, a fluidizing aid; a surface modifier, a primary antirust agent, a defoamer, an antiseptic, an anti-mold agent, a plasticizer, a heat resistance stabilizer, a weather resistance stabilizer, an organic metal coordination compound or a filler.

13. A composition, comprising the aqueous resin composition of claim 1 and a member selected from the group consisting of an aqueous acrylic resin, an aqueous phenolic resin, an aqueous polybutadiene resin, an aqueous alkyd resin, an aqueous chlorinated rubber resin, an aqueous chlorinated polyolefin resin, and an aqueous silicone resin.

14. A composition, comprising the aqueous resin composition of claim 2 and a member selected from the group consisting of an aqueous acrylic resin, an aqueous phenolic resin, an aqueous polybutadiene resin, an aqueous alkyd resin, an aqueous chlorinated rubber resin, an aqueous chlorinated polyolefin resin, and an aqueous silicone resin.

* * * * *